United States Patent
Pandit et al.

(10) Patent No.: US 7,356,170 B2
(45) Date of Patent: Apr. 8, 2008

(54) FINGERPRINT MATCHING METHOD AND SYSTEM

(75) Inventors: Vinayaka D. Pandit, New Delhi (IN); Raghavendra U. Udupa, New Delhi (IN)

(73) Assignee: Lenovo (Singapore) Pte. Ltd. (SG)

( * ) Notice: Subject to any disclaimer, the term of this patent is extended or adjusted under 35 U.S.C. 154(b) by 748 days.

(21) Appl. No.: 10/777,806

(22) Filed: Feb. 12, 2004

(65) Prior Publication Data
US 2005/0180614 A1 Aug. 18, 2005

(51) Int. Cl.
*G06K 9/00* (2006.01)

(52) U.S. Cl. .............. 382/124; 382/190; 382/209; 707/6; 283/68

(58) Field of Classification Search ........... 382/124, 382/125, 115, 302, 116, 209, 127, 126, 190, 382/211, 260, 218, 272, 266, 224; 713/186; 707/6, 7; 283/78, 69, 68; 356/71
See application file for complete search history.

(56) References Cited

U.S. PATENT DOCUMENTS

| | | | |
|---|---|---|---|
| 4,185,270 A | 1/1980 | Fischer II et al. | |
| 4,208,651 A | 6/1980 | McMahon | |
| 4,872,203 A * | 10/1989 | Asai et al. | 383/4 |
| 5,465,303 A | 11/1995 | Levison et al. | |
| 5,841,888 A | 11/1998 | Setlak et al. | |
| 5,845,005 A | 12/1998 | Setlak et al. | |
| 6,005,963 A * | 12/1999 | Bolle et al. | 382/124 |
| 6,021,221 A | 2/2000 | Takaha | |
| 6,041,133 A | 3/2000 | Califano et al. | |
| RE36,656 E | 4/2000 | Califano et al. | |
| 6,181,807 B1 | 1/2001 | Setlak et al. | |
| 6,212,290 B1 | 4/2001 | Gagne et al. | |
| 6,241,288 B1 | 6/2001 | Bergenek et al. | |
| 6,330,345 B1 * | 12/2001 | Russo et al. | 382/115 |
| 6,459,804 B2 * | 10/2002 | Mainguet | 382/124 |
| 6,580,816 B2 * | 6/2003 | Kramer et al. | 382/124 |
| 6,876,757 B2 * | 4/2005 | Yau et al. | 382/125 |
| 7,050,609 B2 * | 5/2006 | Huang | 382/124 |
| 7,162,058 B2 * | 1/2007 | Mimura et al. | 382/124 |

* cited by examiner

*Primary Examiner*—Sheela Chawan
(74) *Attorney, Agent, or Firm*—Gibb & Rahman, LLC

(57) ABSTRACT

A method of matching a query fingerprint to a plurality of file fingerprints. The method comprises the steps of determining a plurality of partial features of each of the file fingerprints. For each partial feature, derive a list of all file fingerprints which have said partial feature as one of their partial features. Determine a plurality of query partial features of the query fingerprint, and derive a ranked list of the file fingerprints based on identifying the individual query partial features in the partial features of the respective file fingerprints. Then perform one-to-one matching of the query fingerprint with selected ones of the ranked list of the file fingerprints.

21 Claims, 3 Drawing Sheets

FINGERPRINT MATCHING METHOD AND SYSTEM

FIELD OF THE INVENTION

The present invention relates broadly to a method and system for matching a query fingerprint to a plurality of file fingerprints, and to a method of maintaining a database of file fingerprints.

BACKGROUND

The problem of fingerprint identification often involves a comparison of a query fingerprint with a data base of stored or file fingerprints. In the domain of fingerprints authentication, this problem is also known as one-to-many matching, fingerprint identification and fingerprint indexing. On the other hand, if a person's claimed identity is to be confirmed or denied by comparing his or her fingerprint with a single reference fingerprint, this problem is typically referred to as fingerprint verification or one-to-one matching.

Since one-to-one matching of the query fingerprint with every fingerprint in the data base of file fingerprints would consume a lot of time and resources, it is not a practical solution to the problem of one-to-many matching. Typically, many one-to-many fingerprint matching systems would have 1,000 to 100,000 fingerprints filed therein, thus making the time and resource requirements inhibitive. One-to-many fingerprint matching can be further complicated because of a number of problems, including the fact that two fingerprints from the same finger may have only a small overlap or common area, and may be approximately related by a rotation and/or translation.

In at least preferred embodiments, the present invention seeks to provide a novel method and system for one-to-many fingerprint matching which can be implemented in software on simple computing facilities like desktop computers or servers in a resource and time efficient manner.

SUMMARY

In accordance with a first aspect of the present invention there is provided a method of matching a query fingerprint to a plurality of file fingerprints. The method comprises the steps of determining a plurality of partial features of each of the file fingerprints. For each partial feature, derive a list of all file fingerprints which have said partial feature as one of their partial features. Determine a plurality of query partial features of the query fingerprint, and derive a ranked list of the file fingerprints based on identifying the individual query partial features in the partial features of the respective file fingerprints. Then perform one-to-one matching of the query fingerprint with selected ones of the ranked list of the file fingerprints.

In accordance with a second aspect of the present invention there is provided a system for matching a query fingerprint to a plurality of file fingerprints. The system comprises a database having stored therein data providing a plurality of partial features of each of the file fingerprints and for each partial feature a list of all file fingerprints which have said partial feature as one of their partial features. The system further comprises a processing unit for determining a plurality of query partial features of the query fingerprint and for deriving ranked list of the file fingerprints based on identifying the individual query partial features in the partial features of the respective file fingerprints from the data stored in the database. The system further comprises a one-to-one fingerprint matching unit for performing one-to-one matching between the query fingerprint and selected ones of the ranked list of the file fingerprints derived by the processing unit.

In accordance with a third aspect of the present invention there is provided a computer program, recorded on a medium, for instructing a computer to conduct a method of matching a query fingerprint to a plurality of file fingerprints. The method comprises the steps of determining a plurality of partial features of each of the file fingerprints. For each partial feature, derive a list of all file fingerprints which have said partial feature as one of their partial features. Determine a plurality of query partial features of the query fingerprint, and derive a ranked list of the file fingerprints based on identifying the individual query partial features in the partial features of the respective file fingerprints. Then perform one-to-one matching of the query fingerprint with selected ones of the ranked list of the file fingerprints.

In accordance with a fourth aspect of the present invention there is provided a method of maintaining a database of file fingerprints. The method comprises the steps of determining a plurality of partial features of each of the file fingerprints, and, for each partial feature, deriving a list of all file fingerprints which have said partial feature as one of their plurality of partial features.

DESCRIPTION OF DRAWINGS

Preferred embodiments of the present invention will now be described, by way of example only, with reference to the accompanying drawings.

DETAILED DESCRIPTION

The preferred embodiment described provides a solution to a one-to-many fingerprint matching problem which can be implemented in software on simple computing facilities like desktop computers or servers without demanding resource intensive computing infrastructure.

Figure 1:
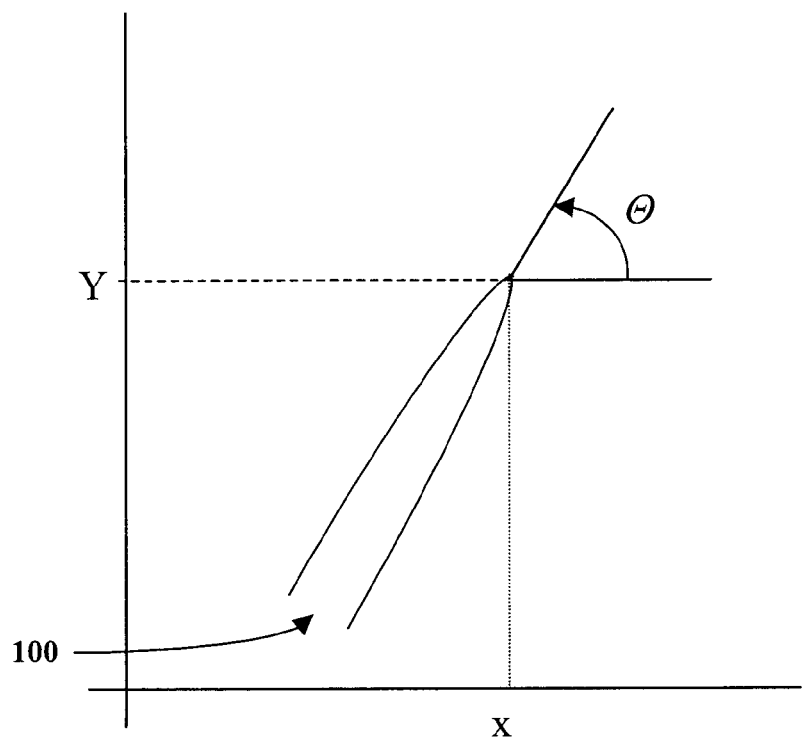
FIG. 1 is a schematic representation of a minutiae feature of a fingerprint.
Figure 2:
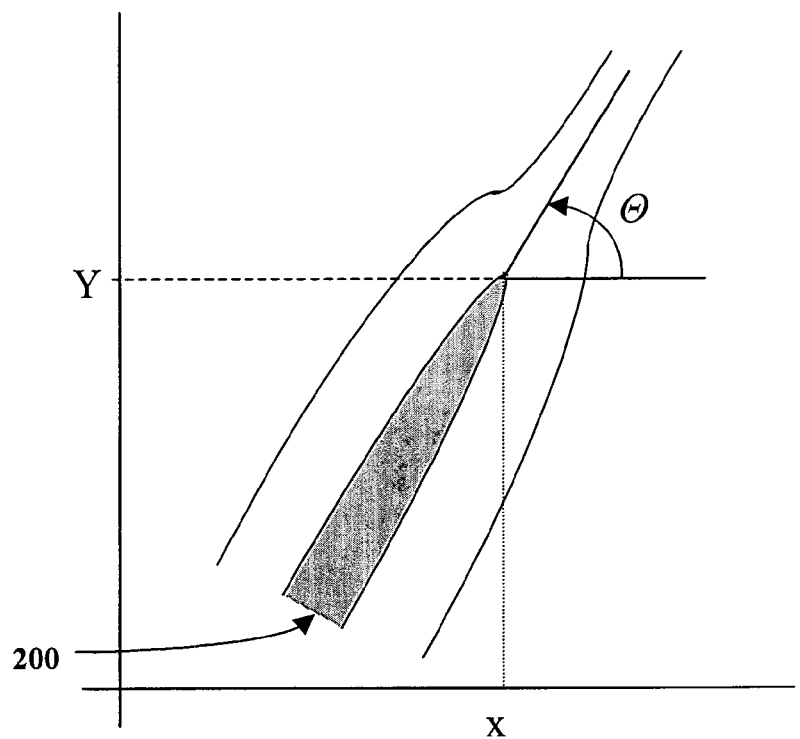
FIG. 2 is a schematic drawing of another minutiae feature of a fingerprint.

A database of file fingerprints in the example embodiment is maintained as a collection of feature sets extracted from the individual fingerprint images using known feature extractors. In the preferred embodiment, the minutiae in the fingerprint image features are utilised. Each minutia is a triplet $(x,y,\theta)$ where $(x,y)$ represents the co-ordinates of the minutia and $\theta$ represents the orientation of the ridge or valley ending. FIGS. 1 and 2 show schematic drawings of example minutiae for points where a ridge 100 or valley 200 of the pattern of epidermal ridges and valleys on a finger end.

Figure 3:
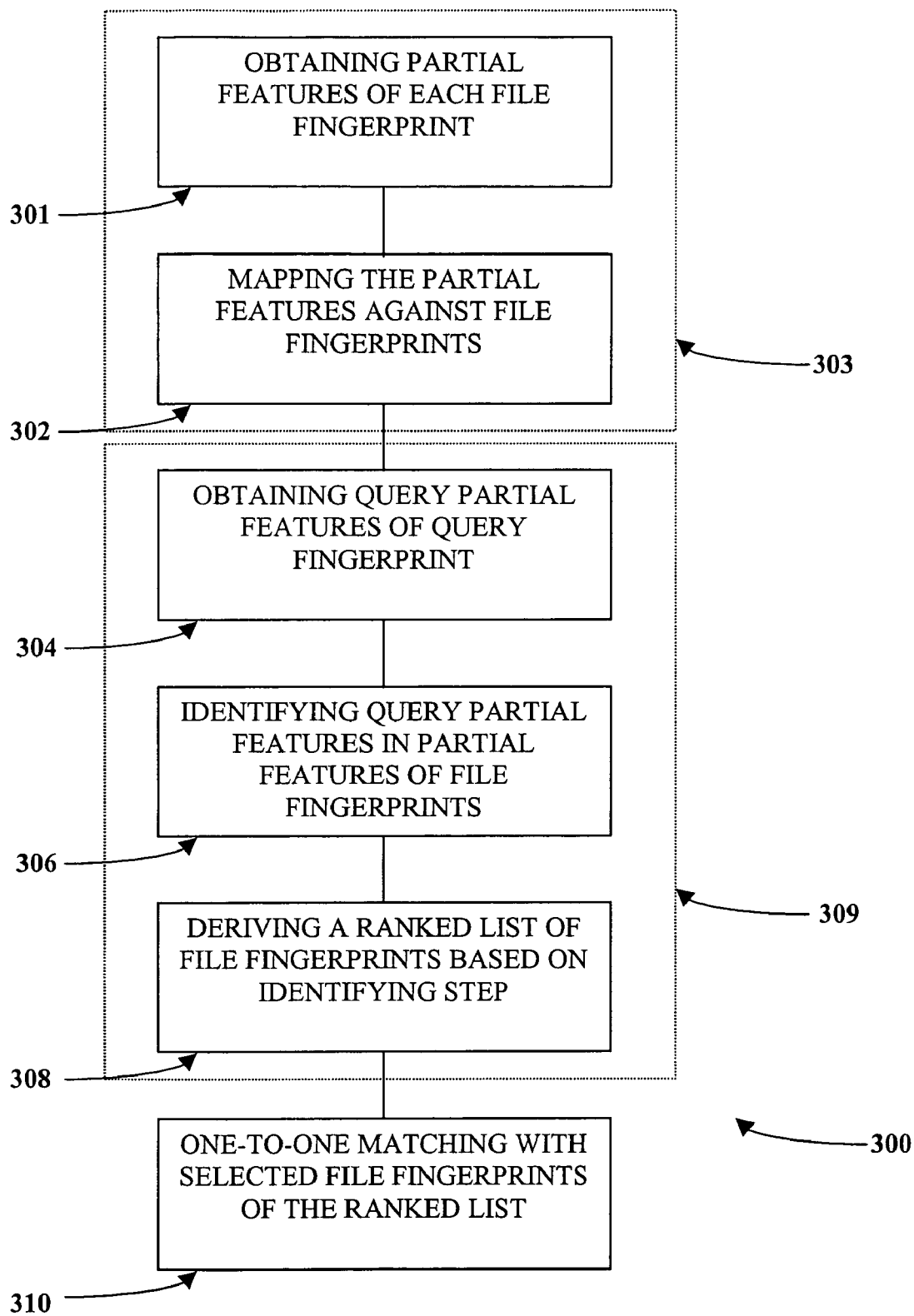
FIG. 3 is a flow chart illustrating a method of fingerprint matching embodying the present invention.

FIG. 3 is a flow chart 300 illustrating a solution to the problem of efficiently retrieving a subset of fingerprints (if any) in a data base that match with a query fingerprint, in an example embodiment. At step 301, a plurality of partial features, in the example embodiment minutiae feature sets, are obtained from each one of the sets of file fingerprint images. At step 302, a mapping is conducted identifying for each minutiae feature set a list of all file fingerprints which have that particular minutiae feature set as one of their plurality of partial features (as obtained at step 301). In other words, for any given minutiae feature set, this mapping lists the set of all fingerprints in the data base that contain that particular minutiae feature set, and a discriminate score for that particular minutiae feature set.

Steps 301 and 302 may be referred to as a "Build Search Structure" component 303 of the solution in the example embodiment. It is noted that the "Build Search Structure" component 303 may not have to be performed for each matching process, where a database containing the file fingerprints is maintained according to the steps 301 and 302.

At step 304, all partial features, again in the form of minutiae feature sets in the example embodiment, are computed for a query fingerprint. Next, for each minutiae feature set of the query fingerprint, a list of all file fingerprints in the data base that contain that particular minutiae feature set is determined at step 306 using the results of the mapping step 302. A match between the query fingerprint and a file fingerprint that contain any one of the minutiae feature sets of the query fingerprint is hypothesised. For each such hypothesis, its score is updated by adding the discriminate score of a particular minutiae feature set at step 308.

The hypotheses are then sorted by their scores and the top few hypotheses are determined as candidate matches. Steps 304, 306, and 308 may be referred to as the "Retrieve Query Matches" component 309 of the solution in the example embodiment. Finally, at step 310 one-to-one matching is performed between the query fingerprint and each of the candidate matches, to conclude the one-to-many identification of the example embodiment.

It will be appreciated by a person skilled in the art that, accordingly, a solution to the problem of one-to-many fingerprint matching is provided in the example embodiment, which can provide increased time and resource efficiency by avoiding the need for one-to-one matching between the query fingerprint and each of the file fingerprints. Furthermore, the use of partial features in the characterisation of the fingerprints can facilitate a successful identification even where there is only a small overlap between the query fingerprint and the file fingerprint of the same finger.

In the following, further details of the implementation of the example embodiment as illustrated in FIG. 3 will be described. Each set of partial features in the form of minutiae feature sets in the example embodiment satisfies the following properties:

1. Geometric separation between any two minutiae in each set is greater than $L_{min}$ and less than $L_{max}$, where $L_{min}$ and $L_{max}$ are positive real numbers.
2. The number of minutiae in each set is at least $N_{min}$ and at most $N_{max}$.

In the example implementation, the minutiae feature sets in a particular fingerprint image are computed as follows:

$L_{min}$ and $L_{max}$ are set in the ranges [50 to 60] and [150 to 180] respectively, measured in [dpi] in digitised fingerprint images.

$N_{min}$ is set to 2, and $N_{max}$ to 3.

Every triplet of minutiae (i.e. $N_{max}$=3) in a fingerprint for which the geometric separation is bounded by $L_{min}$ and $L_{max}$ respectively, is a partial feature of that fingerprint.

Every pair of minutiae ($N_{min}$=2) in the fingerprint for which the geometric separation is bounded by $L_{min}$ and $L_{max}$ respectively, is a partial feature of that fingerprint.

For each fingerprint, a count of number of partial features occurring in it is added to a running count of number of partial features in the database, denoted total.

An ID of each partial feature, denoted PID, is also determined, in the example embodiment in the following manner:

If it is a triplet ($N_{max}$=3), the ID is computed as a function of:
  i) the largest side (l) of the triangle formed by the triplet.
  ii) the difference (d) in the minutiae ridge orientations at the two ends of the largest side of the triangle.
  iii) the angles subtended (a1, a2) by the largest side of the triangle.
  iv) the sum of the ridge counts (r) of the three sides of the triangle.

If the partial feature is a pair of minutiae ($N_{min}$=2), the ID is computed as a function of:
  i) length of the segment (l) joining the pair of minutiae.
  ii) the ridge count (r) of the segment.
  iii) the difference in the minutiae ridge orientations (d) at the two ends of the segment.

For each PID, a list of fingerprints containing at least one partial feature with that ID is maintained in a table T indexed by the ID. A count of the number of occurrences of that partial feature in the data base is maintained, denoted by count[PID]. The discriminate score of each ID is computed as log((total+1)/(count[PID]+1)) in the example embodiment.

During the retrieval of the query matches, a hypothesis table H is maintained, and initially set to empty. For every partial feature P in the form of a minutiae feature set occurring in the query fingerprint, the following steps are taken:

1) Its ID is computed, denoted by PID.
2) The table T is used to retrieve a list of file fingerprints indexed by PID.
3) For each retrieved file fingerprint TF, if a hypothesis of a match between F and TF is already present in H, the discriminate score of PID is added to the score of that hypothesis. Otherwise, a new hypothesis of a match between F and TF is added to H, with an initial score equal to discriminate score of PID.
4) The hypotheses are then sorted by their score in decreasing order, and the best few hypotheses (for example 40) are returned as candidate matches.

Figure 4:
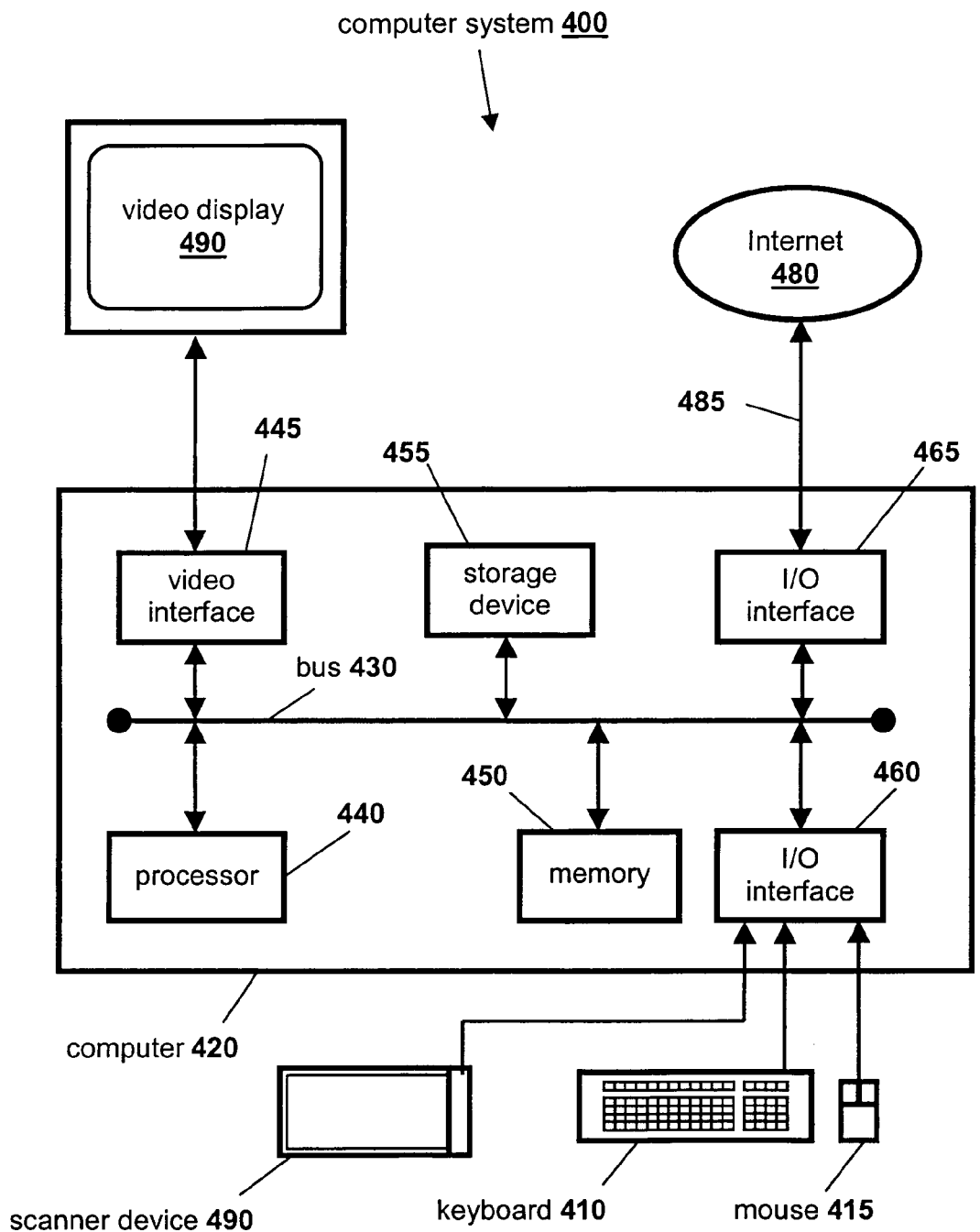
FIG. 4 is a schematic representation of a computer system suitable for performing the techniques described with reference to FIG. 3.

FIG. 4 is a schematic representation of a computer system 400 that can be used to implement the techniques described herein. Computer software executes under a suitable operating system installed on the computer system 400 to assist in performing the described techniques. This computer software is programmed using any suitable computer programming language, and may be thought of as comprising various software code means for achieving particular steps.

The components of the computer system 400 include a computer 420, a keyboard 410 and mouse 415, and a video display 490. The computer 420 includes a processor 440, a memory 450, input/output (I/O) interfaces 460, 465, a video interface 445, and a storage device 455.

The processor 440 is a central processing unit (CPU) that executes the operating system and the computer software executing under the operating system. The memory 450 includes random access memory (RAM) and read-only memory (ROM), and is used under direction of the processor 440.

The video interface 445 is connected to video display 490 and provides video signals for display on the video display 490. User input to operate the computer 420 is provided from the keyboard 410 and mouse 415. The storage device 455 can include a disk drive or any other suitable storage medium.

Each of the components of the computer 420 is connected to an internal bus 430 that includes data, address, and control buses, to allow components of the computer 420 to communicate with each other via the bus 430.

The computer system 400 can be connected to one or more other similar computers via a input/output (I/O) interface 465 using a communication channel 485 to a network, represented as the Internet 480.

The computer software may be recorded on a portable storage medium, in which case, the computer software program is accessed by the computer system 400 from the storage device 455. Alternatively, the computer software can be accessed directly from the Internet 480 by the computer 420. In either case, a user can interact with the computer system 400 using the keyboard 410 and mouse 415 to operate the programmed computer software executing on the computer 420.

The computer system 400 further comprises a fingerprint scanner device 490 connected to the I/O interface 460. The fingerprint scanner device 490 is utilised to obtain a digitised image of a query fingerprint in the example embodiment, and the computer 420 is arranged to obtain minutiae features from the digitised images in the example embodiment.

Other configurations or types of computer systems can be equally well used to implement the described techniques. The computer system 400 described above is described only as an example of a particular type of system suitable for implementing the described techniques.

In Appendix I a pseudo code representation of a computer program for implementing the present invention in an example embodiment is provided.

Various alterations and modifications can be made to the techniques and arrangements described herein, as would be apparent to one skilled in the relevant art.

For example, it will be appreciated that while the example embodiment has been described in the context of minutiae feature sets as partial features, the present invention is not limited to minutiae feature sets as partial features. Rather, the notion of partial features is readily extendable to any invariant property of a fingerprint image or any invariant property involving a combination of features of the fingerprint image. Also, different types of partial features may be used together in different embodiments of the present invention.

Appendix I
PID==ID of a partial feature.
T==a table indexed by IDs of partial features; T[PID] is the list of file fingerprints which have the partial feature whose ID is PID.
count==a table indexed by IDs of partial features; count [PID] is the count of the occurrences of the partial feature whose ID is PID in the file fingerprints.
total==count of the occurrences of all partial features in the file fingerprints.
score==a table indexed by IDs of partial features; score [PID] is the discriminate score of the partial feature whose ID is PID.
H==a Boolean table indexed by fingerprints; H[F,G] is true if a match has been already been hypothesized between fingerprints F and G and false otherwise.
S==a table indexed by fingerprints; S[F,G] is the score of the hypothesized match between fingerprints F and G.

1. Build Search Structure

```
For each fingerprint F in the database D do
    For each partial feature P that occurs in the fingerprint F do
        PID = ComputeID(P);
        If (F is not present in the list T[PID]) then
            Add F to the list T[PID];
        End-if
        count[PID] = count[PID] + 1;
        total = total + 1;
    End-for
end-for
```

For each partial feature P derived from the database D do

```
    PID = ComputeID(P);
    score[PID] = log ((total+1)/(count[PID]+1));
End-for
```

2. Retrieve Query Matches
For each partial feature P that occurs in the query fingerprint F do

```
    PID = ComputeID(P);
    For each fingerprint TF listed in T[PID] do
        If (H[F,TF] == true) then
            S[F,TF] = S[F,TF] + score[PID];
        Else
            H[F,TF] = true;
            S[F,TF] = score[PID];
        End-if
    End-for
End-for
```

Sort the fingerprints in the database D using S[F,G] as the key and return the high ranking fingerprints.

3. Partial Features for a Fingerprint
   For each triplet of minutiae in the fingerprint A do
      If the geometric separation of each pair of minutiae is in the range $[L_{min}, \ldots, L_{max}]$ then
         Select the triplet as a partial feature for the fingerprint A;
   End-for
   For each pair of minutiae do in the fingerprint A do
      If the geometric separation of the pair is in the range $[L_{min}, \ldots, L_{max}]$ then
         Select the pair as a partial feature for the fingerprint A;
   End-for 4. ID of a Partial Feature
   If the partial feature P is a minutiae triplet then
   X=largest side of the triangle formed by the triplet;
   L=length of X;
   D=difference in the minutiae ridge orientations at the two ends of X;
   A1=angle subtended by X at left side;
   A2=angle subtended by X at right side;
   R=sum of the ridge counts of the three sides of the triplet;
   l=quantized value of L in the range $[0, \ldots, M_{dist}]$;
   d=quantized value of D in the range $[0, \ldots, M_{angle}]$;
   a1=quantized value of A1 in the range $[0, \ldots, M_{angle}]$;
   a2=quantized value of A2 in the range $[0, \ldots, M_{angle}]$;
   r=quantized value of R in the range $[0, \ldots, M_{RC}]$;

PID=1+$M_{dist}$*r+$M_{dist}$*$M_{RC}$*a1+$M_{dist}$*$M_{RC}$*$M_{angle}$*a2+ $M_{dist}$* $M_{RC}$*$M_{angle}$*$M_{angle}$*d;
Else if P is minutiae pair then
X=line segment joining the minutiae pair;
L=length of X;
R=ridge count of X;
D=difference in the minutiae ridge orientations at the two ends of X;
I=quantized value of L in the range [0, . . . , $M_{dist}$];
r=quantized value of R in the range [0, . . . , $M_{RC}$];
d=quantized value of D in the range [0, . . . , $M_{angle}$];
PID=OFFSET+1+$M_{dist}$*r+$M_{dist}$*$M_{RC}$*d where OFFSET=$M_{dist}$*$M_{RC}$* $M_{angle}$*$M_{angle}$*$M_{angle}$;
End-if

We claim:

1. A method of matching a query fingerprint to a plurality of file fingerprints, the method comprising the steps of:
   determining a plurality of partial features of each of the file fingerprints,
   for each partial feature, deriving a list of all file fingerprints which have said partial feature,
   determining a plurality of query partial features of the query fingerprint;
   identifying file fingerprints comprising partial features that match said query partial features of said query fingerprint;
   deriving a ranked list of the file fingerprints based on said identifying; and
   performing a one-to-one matching of the query fingerprint only with file fingerprints comprising a pre-determined rank in said ranked list.

2. The method as claimed in claim 1, wherein the method comprises associating a discriminate score with each partial feature based on the number of file fingerprints which have said partial feature as one of their partial features, and the step of deriving the ranked list of the file fingerprints comprises updating scores for matches between the query fingerprint and individual ones of the file fingerprints based on the discriminate scores of one or more partial features identified in the individual file fingerprints as one of the query partial features.

3. The method as claimed in claim 2, wherein the discriminate score is calculated in a manner such that it has higher values for partial features that occur in a smaller number of file fingerprints.

4. The method as claimed in claim 3, wherein the discriminate scores are further based on a total number of partial features in all of the file fingerprints.

5. The method as claimed in claim 1, wherein the partial features comprise minutiae feature sets.

6. The method as claimed in claim 5, wherein the minutiae feature sets each comprise a set of minutiae features for which a geometric separation between any two minutiae in it falls within a predetermined range.

7. The method as claimed in claim 6, wherein a number of minutiae features in each minutiae feature set falls within a predetermined range.

8. A system for matching a query fingerprint to a plurality of file fingerprints, the system comprising:
   a database having stored data therein providing a plurality of partial features of each of the file fingerprints and for each partial feature a list of all file fingerprints which have said partial feature;
   a processing unit for
      determining a plurality of query partial features of the query fingerprint,
      identifying file fingerprints comprising partial features that match said query partial features of said query fingerprint, and
      deriving ranked list of the file fingerprints based on said identifying; and
   a one-to-one fingerprint matching unit for performing one-to-one matching between the query fingerprint and only file fingerprints comprising a pre-determined rank in said ranked list.

9. The system as claimed in claim 8, wherein the processing unit associates a discriminate score with each partial feature based on the number of file fingerprints which have said partial feature as one of their partial features, and updates scores for matches between the query fingerprint and individual ones of the file fingerprints based on the discriminate scores of one or more partial features identified in the individual file fingerprints as one of the query partial features during the deriving of the ranked list of the file fingerprints.

10. The system as claimed in claim 9, wherein the processing unit calculates the discriminate scores in a manner such that it has higher values for partial features that occur in a smaller number of file fingerprints.

11. The system as claimed in claim 10, wherein the processing unit further bases the discriminate score on a total number of partial features in all of the file fingerprints.

12. The system as claimed in claim 8, wherein the partial features comprise minutiae feature sets.

13. The system as claimed in claim 12, wherein the minutiae feature sets each comprise a set of minutiae features for which a geometric separation between any two minutiae in it falls within a predetermined range.

14. The system as claimed in claim 13, wherein a number of minutiae features in each minutiae feature set falls within a predetermined range.

15. A computer program, recorded on a medium, for instructing a computer to conduct a method of matching a query fingerprint to a plurality of file fingerprints, the method comprising the steps of:
   determining a plurality of partial features of each of the file fingerprints;
   for each partial feature, deriving a list of all file fingerprints which have said partial feature;
   determining a plurality of query partial features of the query fingerprint;
   identifying file fingerprints comprising partial features that match said query partial features of said query fingerprint;
   deriving a ranked list of the file fingerprints based on said identifying; and
   performing a one-to-one matching of the query fingerprint only with file fingerprints comprising a pre-determined rank in said ranked list.

16. The computer program as claimed in claim 15, wherein the method comprises associating a discriminate score with each partial feature based on the number of file fingerprints which have said partial feature as one of their partial features, and the step of deriving the ranked list of the file fingerprints comprises updating scores for matches between the query fingerprint and individual ones of the file fingerprints based on the discriminate scores of one or more partial features identified in the individual file fingerprints as one of the query partial features.

17. The computer program as claimed in claim 16, wherein the discriminate score is calculated in a manner such that it has higher values for partial features that occur in a smaller number of file fingerprints.

18. The computer program as claimed in claim 17, wherein the discriminate scores are further based on a total number of partial features in all of the file fingerprints.

19. The computer program as claimed in claim 15, wherein the partial features comprise minutiae feature sets.

20. The computer program as claimed in claim 19, wherein the minutiae feature sets each comprise a set of minutiae features for which a geometric separation between any two minutiae in it falls within a predetermined range.

21. The computer program as claimed in claim 20, wherein a number of minutiae features in each minutiae feature set falls within a predetermined range.

\* \* \* \* \*